(12) United States Patent  
Kim

(10) Patent No.: US 11,907,086 B2
(45) Date of Patent: Feb. 20, 2024

(54) INFOTAINMENT DEVICE FOR VEHICLE AND METHOD FOR OPERATING SAME

(71) Applicant: LG ELECTRONICS INC., Seoul (KR)

(72) Inventor: Jinkyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 147 days.

(21) Appl. No.: 17/761,967

(22) PCT Filed: Sep. 18, 2019

(86) PCT No.: PCT/KR2019/012067
§ 371 (c)(1),
(2) Date: Mar. 18, 2022

(87) PCT Pub. No.: WO2021/054492
PCT Pub. Date: Mar. 25, 2021

(65) Prior Publication Data
US 2022/0342782 A1   Oct. 27, 2022

(51) Int. Cl.
*G06F 11/20* (2006.01)
*B60K 35/00* (2006.01)
(Continued)

(52) U.S. Cl.
CPC .......... *G06F 11/2028* (2013.01); *B60K 35/00* (2013.01); *G06F 11/0739* (2013.01);
(Continued)

(58) Field of Classification Search
CPC ............. G06F 11/0739; G06F 11/2028; G06F 15/7807; G06F 21/33; G06F 21/45
(Continued)

(56) References Cited

U.S. PATENT DOCUMENTS 11,265,721 B1 * 3/2022 Satpathy ................ G02B 30/22
2013/0282946 A1    10/2013 Ricci
(Continued)

FOREIGN PATENT DOCUMENTS

CN    109815054    5/2019
KR    101782699    9/2017
(Continued)

OTHER PUBLICATIONS

State Intellectual Property Office of the People's Republic of China Application Serial No. 201980005473.1, Office Action dated Apr. 7, 2023, 16 pages.
(Continued)

*Primary Examiner* — Chae M Ko
(74) *Attorney, Agent, or Firm* — LEE, HONG, DEGERMAN, KANG & WAIMEY

(57) ABSTRACT

Disclosed is a base unit including a video link hub electrically connected to a user interface device to transmit a signal, a first system-on-chip (SoC) configured to provide a first infotainment function, and a processor configured to determine whether the first SoC is operating abnormally. When a second SoC is powered on, the first SoC performs authentication with respect to the second SoC, and when the processor determines that the first SoC is operating normally, the first SoC generates a first execution signal for display of a composite infotainment function, obtained by combining the first infotainment function with a second infotainment function provided by the second SoC, on the user interface device, and transmits the first execution signal to the video link hub, and the processor controls the video link hub to transmit the first execution signal to the user interface device.

19 Claims, 12 Drawing Sheets

(51) Int. Cl.
    *G06F 11/07*          (2006.01)
    *G06F 15/78*          (2006.01)
    *G06F 21/33*          (2013.01)
    *G06F 21/45*          (2013.01)

(52) U.S. Cl.
    CPC .......... *G06F 15/7807* (2013.01); *G06F 21/33* (2013.01); *G06F 21/45* (2013.01); *B60K 2370/11* (2019.05); *B60K 2370/164* (2019.05); *B60K 2370/592* (2019.05)

(58) Field of Classification Search
    USPC .............................. 714/4.11, 11, 13; 713/169
    See application file for complete search history.

(56) References Cited

U.S. PATENT DOCUMENTS

| | | | |
|---|---|---|---|
| 2016/0241999 A1* | 8/2016 | Chin ................. | G07C 9/00182 |
| 2017/0109545 A1* | 4/2017 | Yamamoto ............. | G06F 21/44 |
| 2022/0006808 A1* | 1/2022 | Gremaud ................ | H04L 63/08 |
| 2022/0075863 A1* | 3/2022 | Koyuncu .............. | H04L 9/0861 |

FOREIGN PATENT DOCUMENTS

| | | |
|---|---|---|
| KR | 1020170100779 | 9/2017 |
| KR | 1020180004030 | 1/2018 |
| KR | 1020190098097 | 8/2019 |

OTHER PUBLICATIONS

PCT International Application No. PCT/KR2019/012067, International Search Report dated Jun. 16, 2020, 4 pages.

\* cited by examiner

[FIG.1]
10
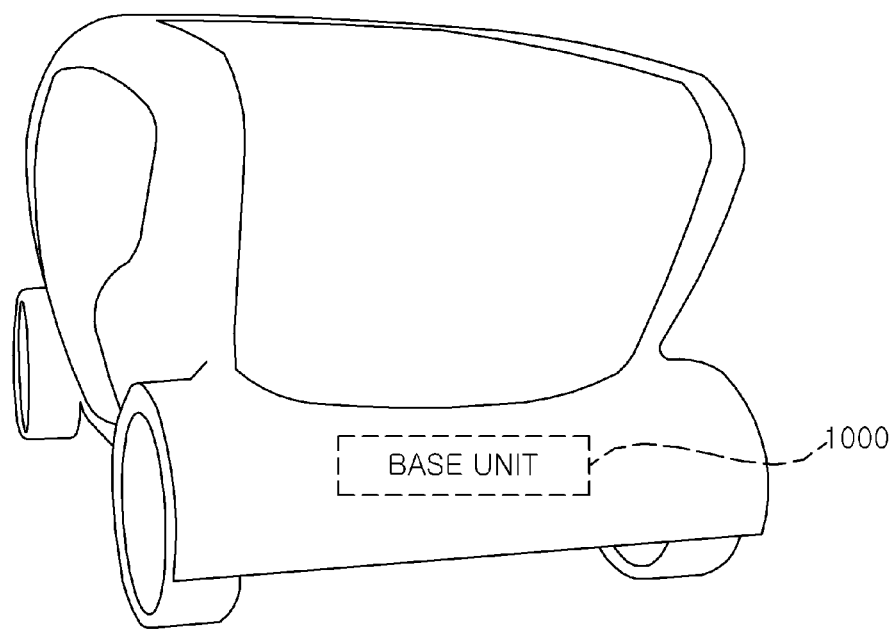
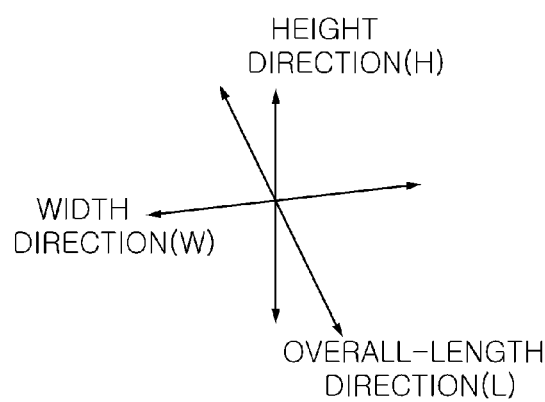

[FIG.2]
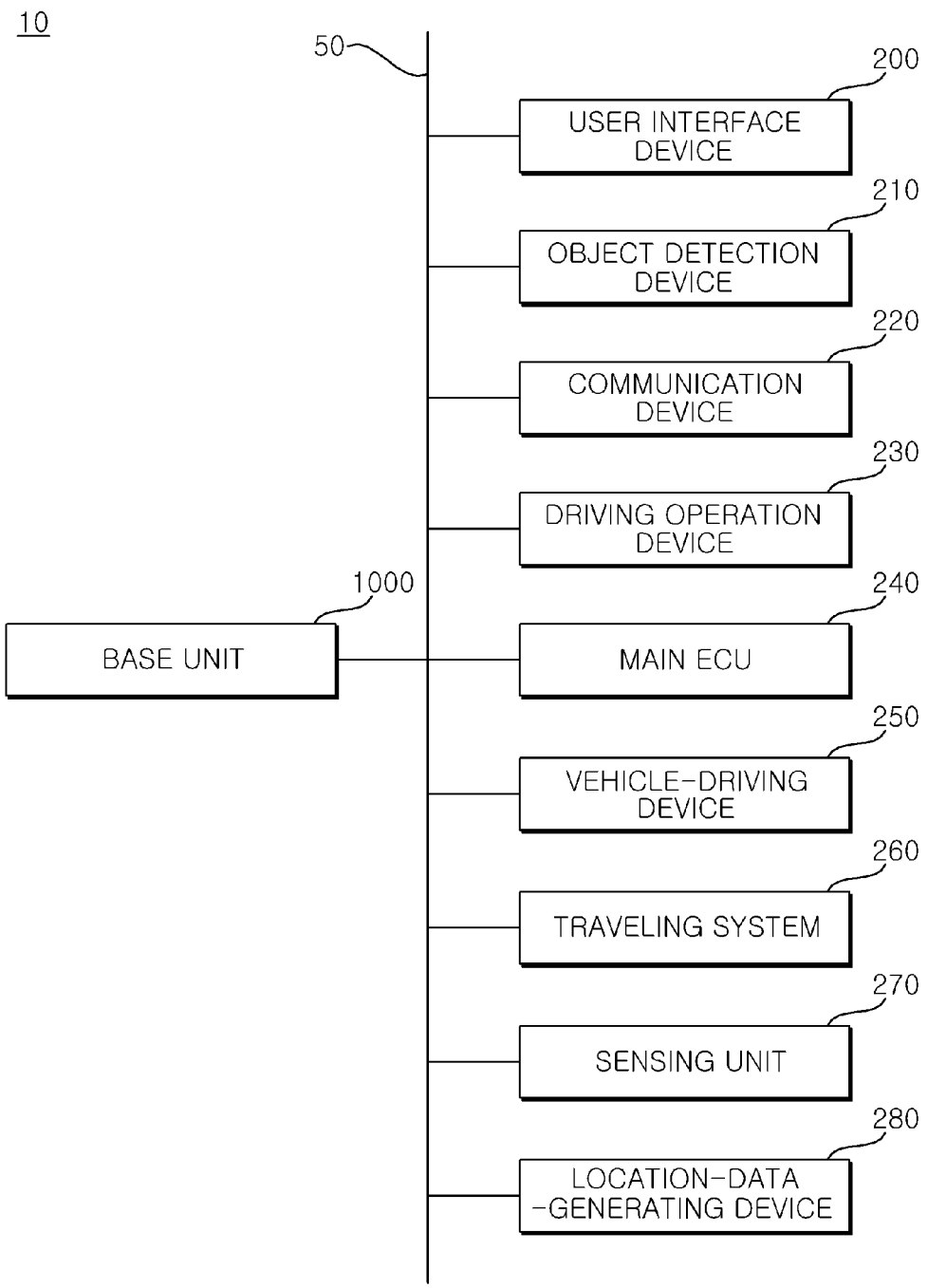

[FIG.3]
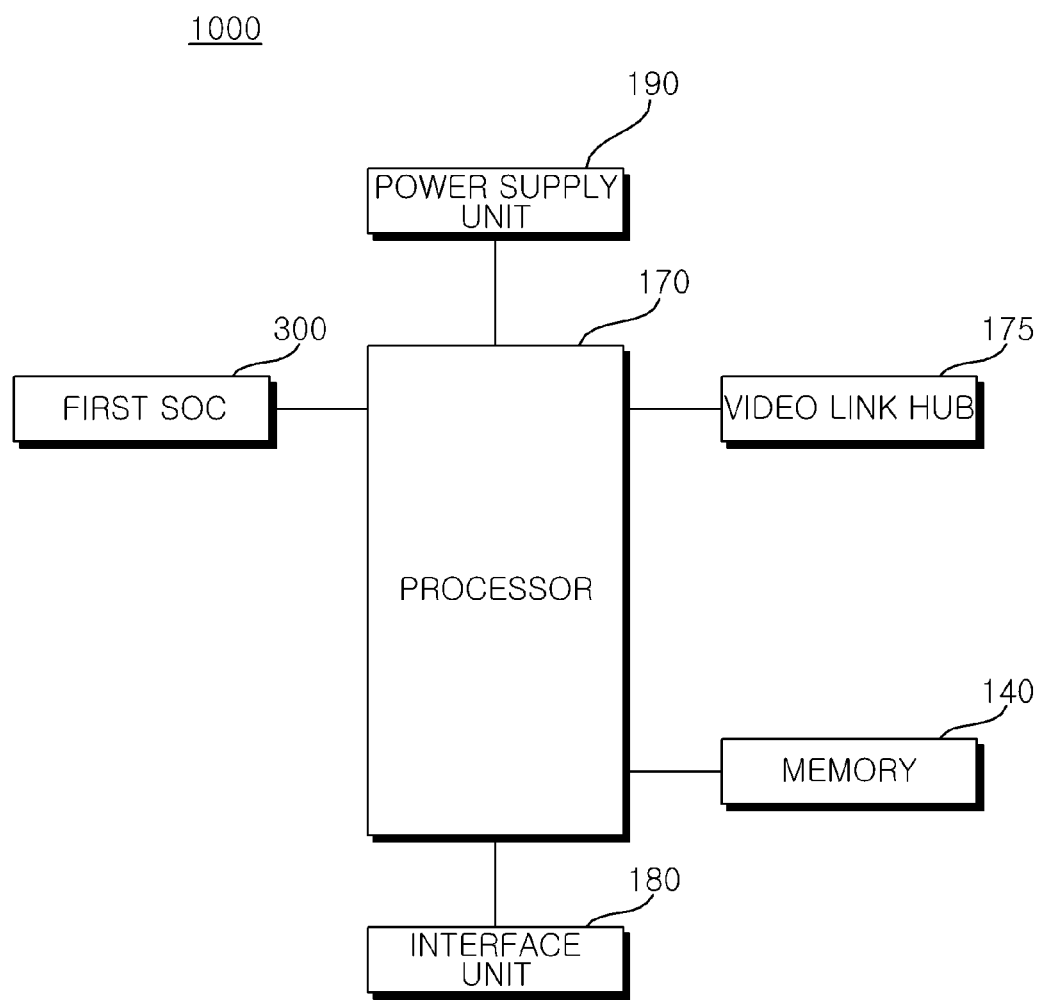

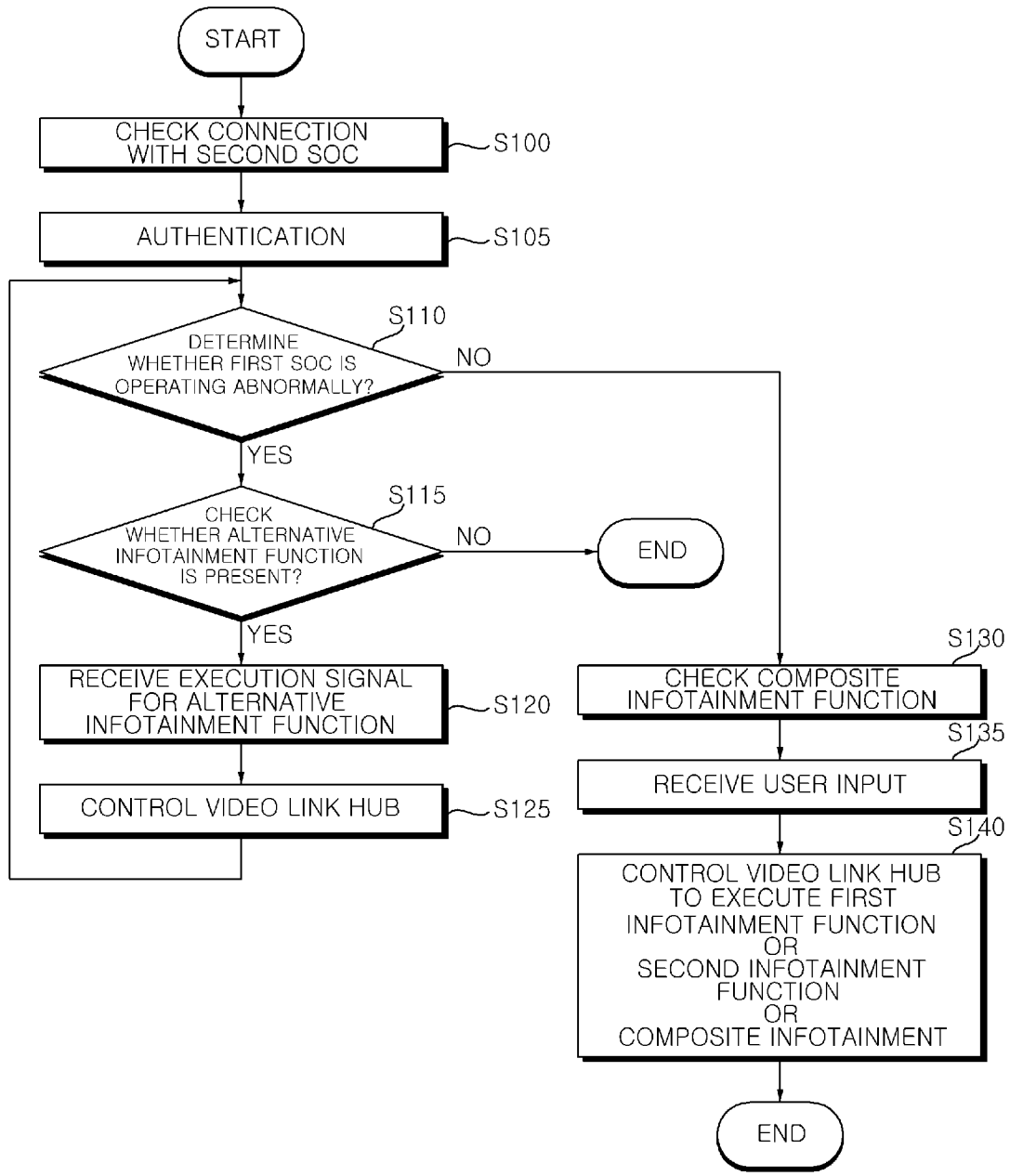
[FIG.4]

[FIG.5]
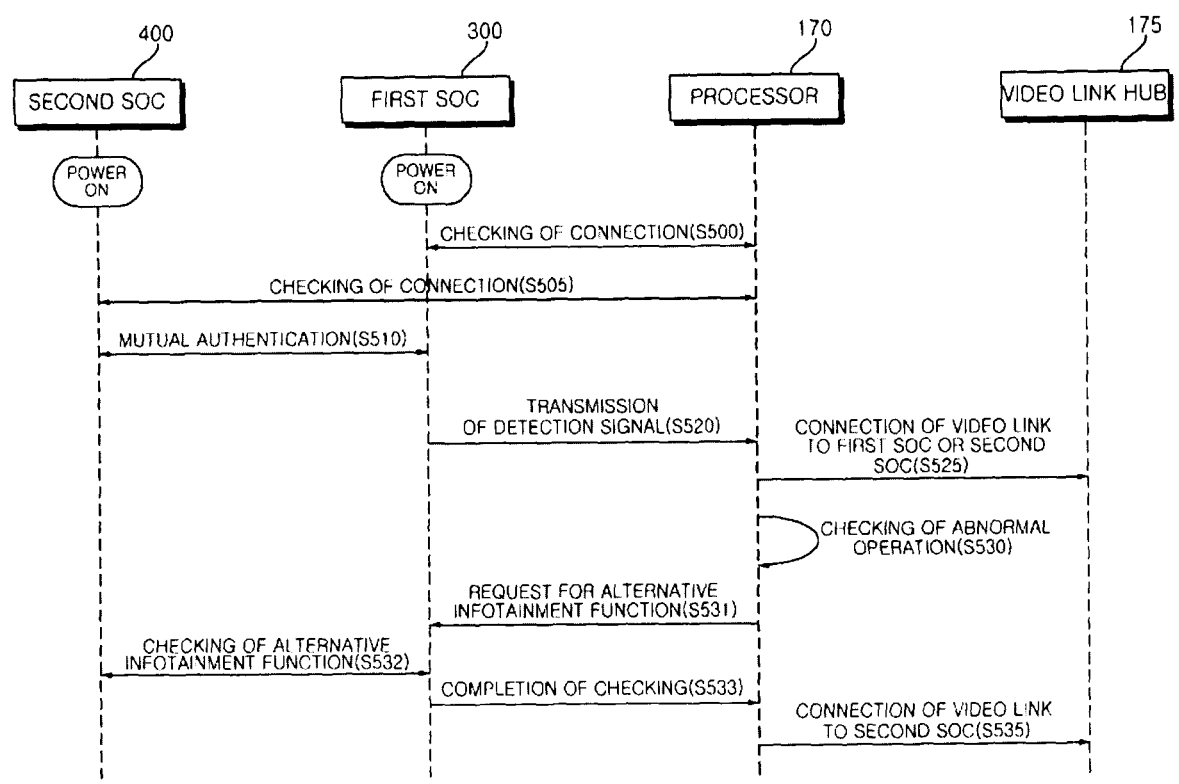

[FIG.6]
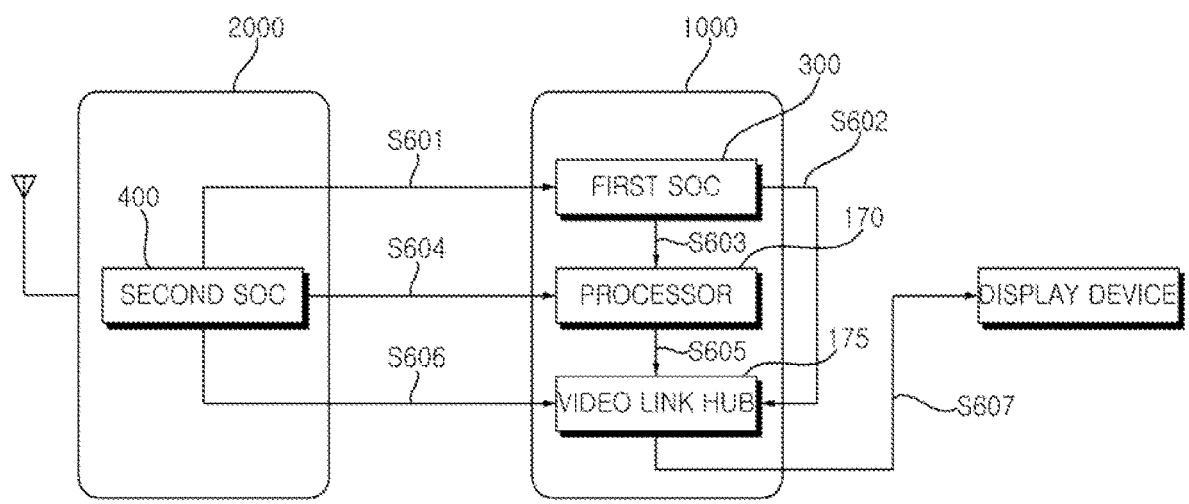

【FIG.7a】
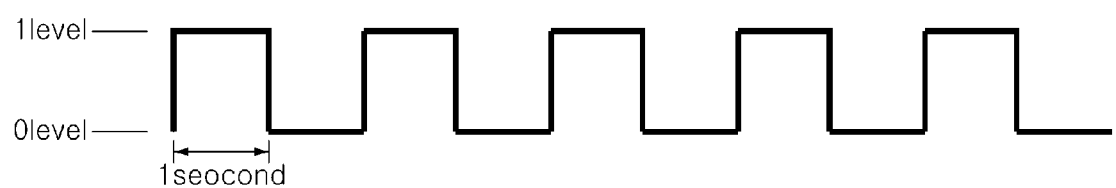
【FIG.7b】
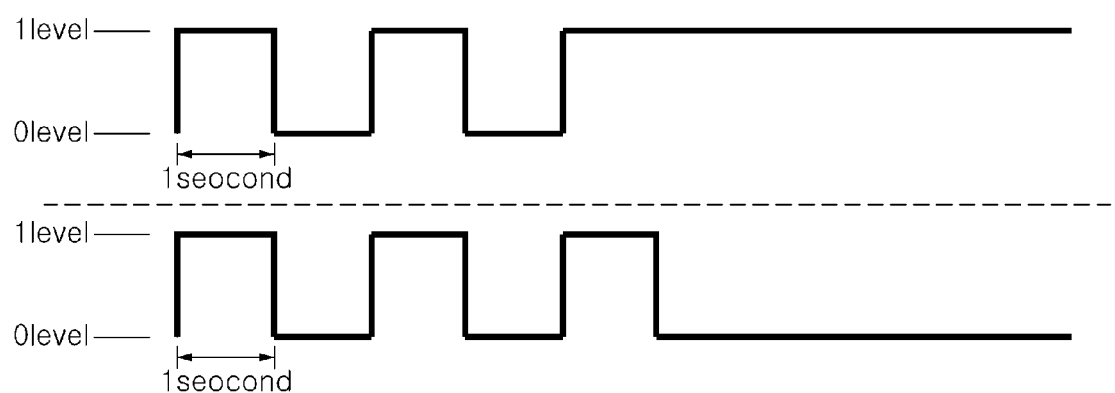

[FIG.8]
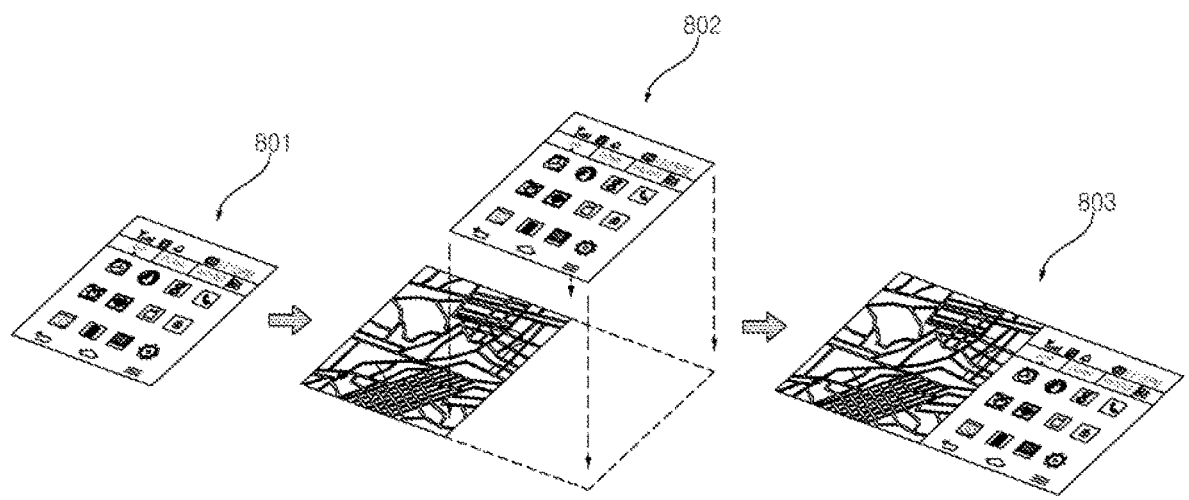

【FIG.9a】
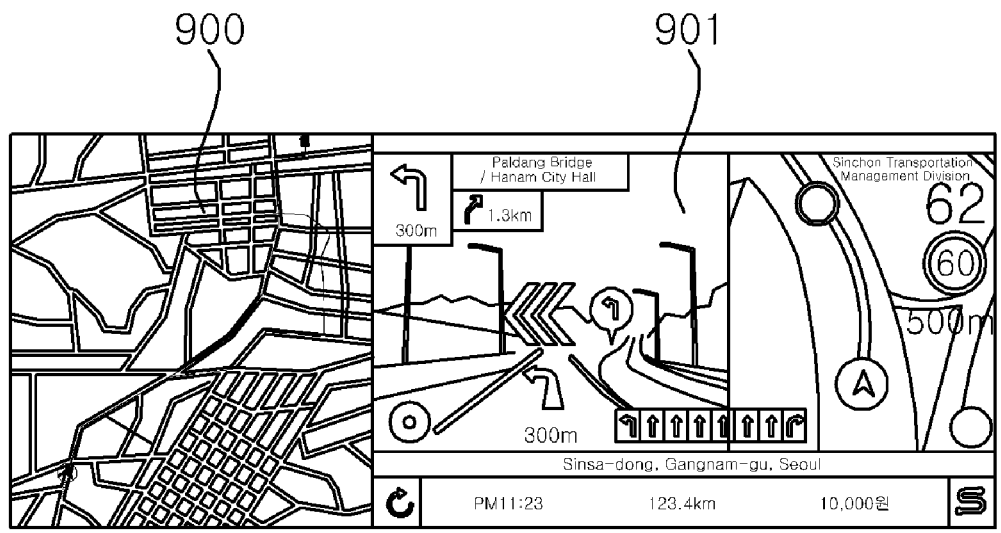
【FIG.9b】
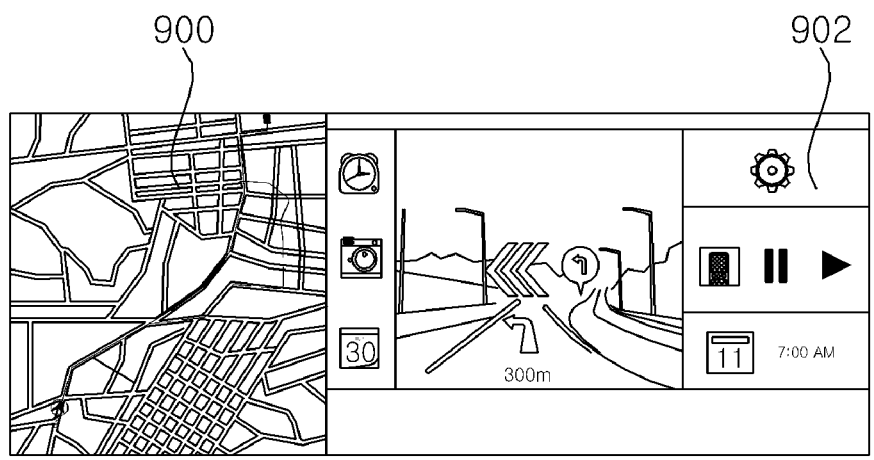

[FIG.9c]
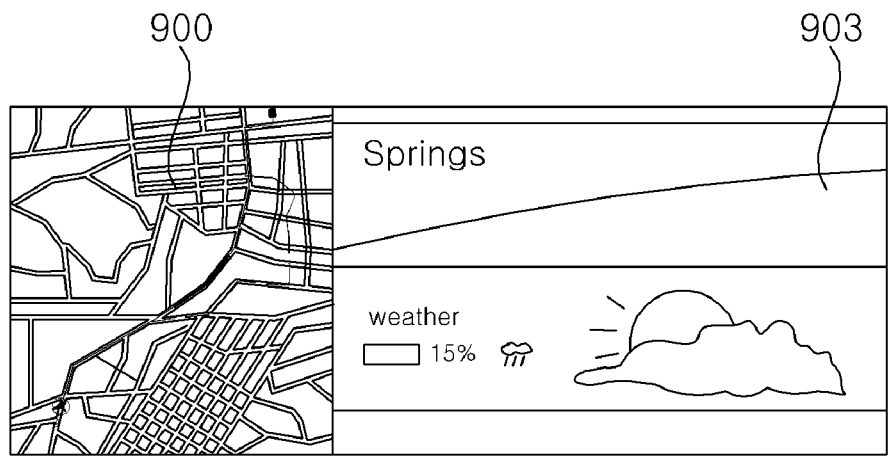

[FIG. 10]
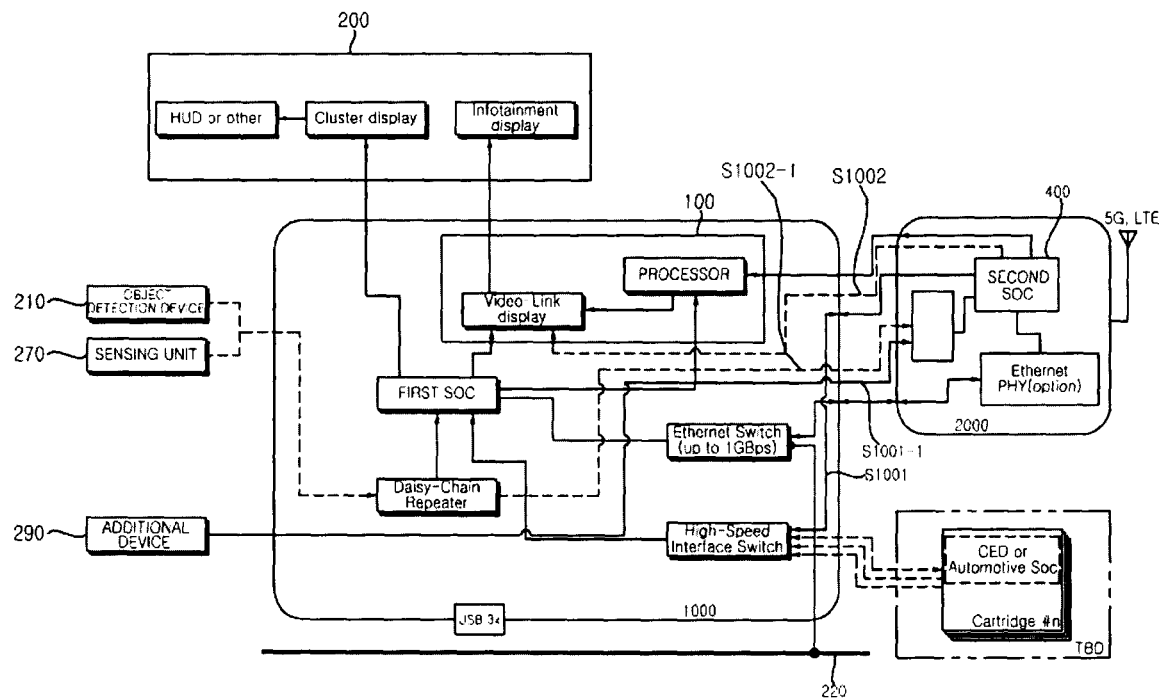

[FIG. 11]
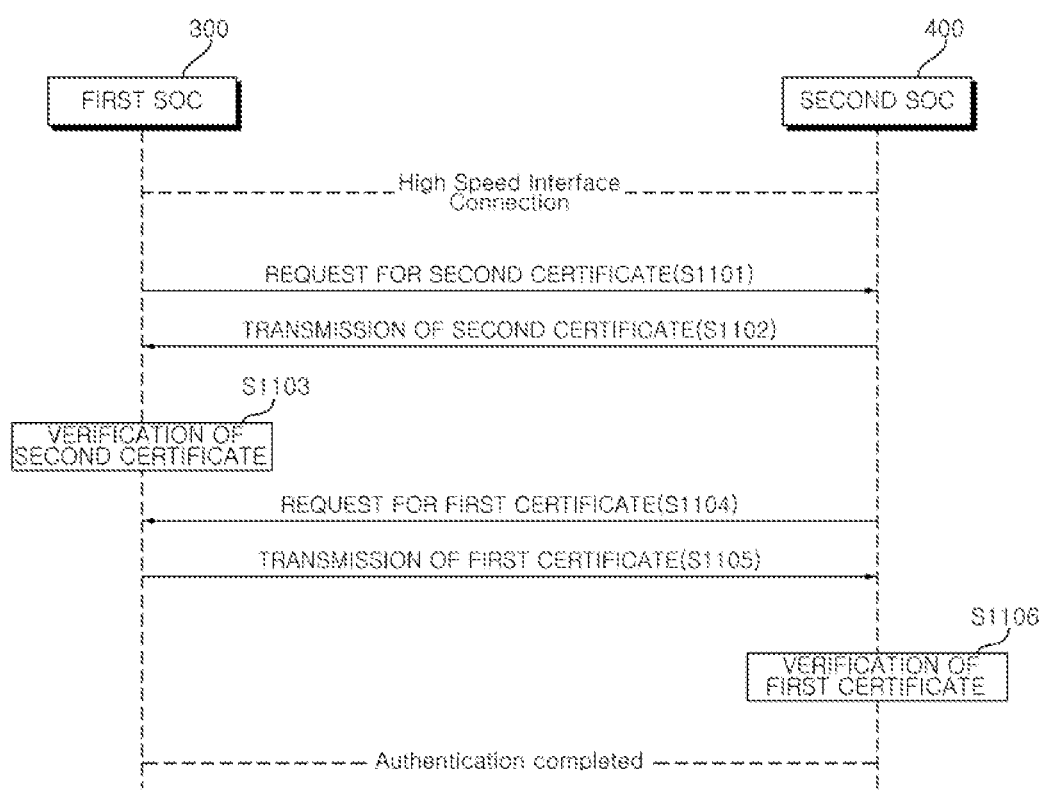

INFOTAINMENT DEVICE FOR VEHICLE AND METHOD FOR OPERATING SAME

CROSS-REFERENCE TO RELATED APPLICATIONS

This application is the National Stage filing under 35 U.S.C. 371 of International Application No. PCT/KR2019/012067, filed on Sep. 18, 2019, the contents of which are hereby incorporated by reference herein their entirety.

TECHNICAL FIELD

The present disclosure relates to an in-vehicle infotainment device and an operation method thereof, and more particularly to an electronic device capable of detecting, in a system with multiple system-on-chips (SoCs), whether a base SoC is operating abnormally and of achieving redundancy of the base SoC using an additional SoC.

BACKGROUND ART

A vehicle is an apparatus that moves in a direction desired by a user riding therein. A representative example of a vehicle is an automobile. An autonomous vehicle is a vehicle that is capable of automatically traveling without driving manipulation by a human.

Recently, with the development of vehicle technology, an in-vehicle infotainment system has been widely used. The in-vehicle infotainment system is the result of integration of an information system providing information necessary for driving, route guidance, and the like with an entertainment system providing various forms of entertainment and human-friendly functions.

Future vehicles will be preferentially directed toward autonomous driving, shared use, and provision of entertainment. An in-vehicle infotainment system is expected to become more important. Therefore, various research on in-vehicle infotainment is underway.

Meanwhile, Related Art WO2019096676A1 discloses an infotainment system including multiple SoCs, in which hardware components can be interchangeably replaced with software components, and thus software update is implemented in a flexible and efficient manner.

In the above related art, interfaces between respective units are defined in a manner of separating the functions of a base unit and a cartridge from each other. However, there is no solution for the situation in which the system operates abnormally, and thus safe driving by a driver may be compromised when the system operates abnormally or reboots.

Therefore, there is a need for an in-vehicle infotainment device for providing a user interface (UI) enabling a driver to safely manipulate the functions of a vehicle even when a base unit operates abnormally.

DISCLOSURE

Technical Problem

The present disclosure has been made in view of the above problems, and it is an object of the present disclosure to provide a base unit capable of realizing redundancy of an infotainment system using a cartridge when the base unit operates abnormally, and an in-vehicle infotainment system including the base unit.

In addition, it is an object of the present disclosure to provide an in-vehicle infotainment system capable of recognizing an SoC that is operating abnormally by detecting abnormal operation of the base unit and the cartridge.

In addition, it is an object of the present disclosure to provide an in-vehicle infotainment system capable of being upgraded through electronic connection with an SoC of the cartridge, which is upgradable.

The objects to be accomplished by the disclosure are not limited to the above-mentioned objects, and other objects not mentioned herein will be clearly understood by those skilled in the art from the following description.

Technical Solution

In order to accomplish the above objects, a base unit of an in-vehicle infotainment system according to the present disclosure includes a video link hub electrically connected to a user interface device to transmit a signal, a first system-on-chip (SoC) configured to provide a first infotainment function, and a processor configured to determine whether the first SoC is operating abnormally.

The base unit of the in-vehicle infotainment system according to the present disclosure includes a first SoC, which performs authentication with respect to a second SoC when the second SoC is powered on and which checks whether an alternative infotainment function replacing the first infotainment function is present in a second infotainment function provided by the second SoC when a processor determines that the first SoC is operating abnormally.

The base unit of the in-vehicle infotainment system according to the present disclosure includes a processor, which, when a first SoC checks that an alternative infotainment function is present in a second infotainment function, controls a video link hub to execute the alternative infotainment function.

The base unit of the in-vehicle infotainment system according to the present disclosure includes a processor, which receives a detection signal generated by a first SoC, monitors the detection signal, and determines that the first SoC is operating abnormally upon determining that the detection signal does not have a designated period or waveform.

An in-vehicle infotainment system according to the present disclosure includes a video link hub electrically connected to a user interface device to transmit a signal, a first system-on-chip (SoC) configured to provide a first infotainment function, a second SoC configured to provide a second infotainment function, and a processor configured to determine whether the first SoC is operating abnormally.

Details of other embodiments are included in the detailed description and the accompanying drawings.

Advantageous Effects

According to the present disclosure, there are one or more effects as follows.

First, occurrence of abnormal operation of the first SoC is determined by monitoring a detection signal, and thus abnormal operation of the first SoC may be intuitively recognized.

Second, when it is determined that the first SoC is operating abnormally, the second SoC executes an alternative infotainment function replacing a first infotainment function, and thus redundancy of the function of the first SoC may be achieved.

Third, a determination is made as to whether any of multiple SoCs is operating abnormally, and the video link hub is controlled to output image data through an SoC that is operating normally, whereby the safety of a driver during driving may be improved.

Fourth, it may be possible to upgrade the infotainment system through the second SoC, which communicates with an external server.

The effects achievable through the disclosure are not limited to the above-mentioned effects, and other effects not mentioned herein will be clearly understood by those skilled in the art from the appended claims.

DESCRIPTION OF DRAWINGS

FIG. 1 is a view showing the external appearance of a vehicle according to an embodiment of the present disclosure.

FIG. 2 is a control block diagram of the vehicle according to the embodiment of the present disclosure.

FIG. 3 is a control block diagram of a base unit included in an in-vehicle infotainment system according to an embodiment of the present disclosure.

FIG. 4 is a flowchart of the base unit according to the embodiment of the present disclosure.

FIG. 5 is a flow diagram of a signal for each entity according to the embodiment of the present disclosure.

FIG. 6 is a diagram illustrating redundancy of the base unit and a cartridge according to the embodiment of the present disclosure.

FIGS. 7A and 7B are diagrams illustrating a detection signal according to the embodiment of the present disclosure.

FIG. 8 is a diagram illustrating a composite infotainment function according to the embodiment of the present disclosure.

FIGS. 9A to 9C are diagrams illustrating utilization of a second infotainment function according to the embodiment of the present disclosure.

FIG. 10 is a diagram illustrating an infotainment system according to the embodiment of the present disclosure.

FIG. 11 is a diagram illustrating a mutual authentication process between a first SoC and a second SoC according to the embodiment of the present disclosure.

BEST MODE

Hereinafter, embodiments of the present disclosure will be described in detail with reference to the attached drawings. Like reference numerals denote the same or similar components throughout the drawings, and a redundant description of the same components will be avoided. The terms "module" and "unit", with which the names of components are suffixed, are assigned or used only in consideration of preparation of the specification, and may be interchanged with each other. The terms do not have any distinguishable meanings or roles. A detailed description of a related known technology will be omitted where it is determined that the same would obscure the subject matter of embodiments of the present disclosure. Further, the attached drawings are provided to help easy understanding of embodiments of the present disclosure, rather than to limit the scope and spirit of the present disclosure. Thus, it is to be understood that the present disclosure covers all modifications, equivalents, and alternatives falling within the scope and spirit of the present disclosure.

While ordinal numbers including "first", "second", etc. may be used to describe various components, they are not intended to limit the components. These expressions are used only to distinguish one component from another component.

When it is said that a component is "connected to" or "coupled to" another component, it should be understood that the one component may be connected or coupled to the other component directly or through some other component therebetween. On the other hand, when it is said that a component is "directly connected to" or "directly coupled to" another component, it should be understood that there is no other component between the components.

Singular forms include plural referents unless the context clearly dictates otherwise.

In the following description, the term "include" or "have" signifies the presence of a specific feature, number, step, operation, component, part, or combination thereof, but without excluding the presence or addition of one or more other features, numbers, steps, operations, components, parts, or combinations thereof.

FIG. 1 is a view showing a vehicle according to an embodiment of the present disclosure.

Referring to FIG. 1, a vehicle 10 according to an embodiment of the present disclosure is defined as a transportation means that travels on a road or on rails. The vehicle 10 conceptually encompasses cars, trains, and motorcycles. The vehicle 10 may be any of an internal combustion vehicle equipped with an engine as a power source, a hybrid vehicle equipped with an engine and an electric motor as power sources, an electric vehicle equipped with an electric motor as a power source, and the like. The vehicle 10 may be a shared vehicle. The vehicle 10 may be an autonomous vehicle.

The vehicle 10 may include an electronic device. The electronic device may be a base unit 1000 of an in-vehicle infotainment system 100 for providing a UI, with which a driver is capable of safely manipulating functions of the vehicle 10.

FIG. 2 is a control block diagram of the vehicle according to the embodiment of the present disclosure.

Referring to FIG. 2, the vehicle 10 may include a vehicular base unit 1000, a user interface device 200, an object detection device 210, a communication device 220, a driving operation device 230, a main ECU 240, a vehicle-driving device 250, a traveling system 260, a sensing unit 270, and a location-data-generating device 280.

The base unit 1000 may be an electronic device constituting the in-vehicle infotainment system 100, and may provide a first infotainment function. The first infotainment function may include a function of providing at least one of information on the state of the vehicle, information on the travel of the vehicle, or audio video navigation (AVN) information, which is generated based on data acquired through at least one of the object detection device 210, the sensing unit 270, the communication device 220, or the location-data-generating device 280.

When the base unit 1000 operates abnormally and is thus incapable of providing the first infotainment function, the base unit 1000 may check the function of a cartridge 2000, and may control a processor to implement an infotainment function replacing the first infotainment function, thereby achieving redundancy of the infotainment system 100.

The user interface device 200 is a device used to enable the vehicle 10 to communicate with a user. The user interface device 200 may receive user input and may provide information generated by the vehicle 10 to the user. The vehicle 10 may implement a User Interface (UI) or a User Experience (UX) through the user interface device 200.

The user interface device 200 may implement a UI enabling safe manipulation of the functions of the vehicle 10 through the in-vehicle infotainment system 100.

The user interface device 200 may include an input unit and an output unit.

The input unit is used to receive information from a user. Data collected by the input unit may be processed as a control command of the user. The input unit may include a voice input unit, a gesture input unit, a touch input unit, and a mechanical input unit.

The output unit is used to generate a visual output, an acoustic output, or a haptic output. The output unit may include at least one of a display unit, an audio output unit, or a haptic output unit.

The display unit may display graphic objects corresponding to various pieces of information. The display unit may include at least one of a Liquid Crystal Display (LCD), a Thin Film Transistor Liquid Crystal Display (TFT LCD), an Organic Light-Emitting Diode (OLED) display, a flexible display, a three-dimensional (3D) display, or an e-ink display.

The display unit may be implemented as a touch screen by forming a multi-layered structure with the touch input unit or by being integrated with the touch input unit. The display unit may be configured as a Head Up Display (HUD). In this case, the display unit may be provided with a projection module, and may output information through an image projected onto the windshield or the window. The display unit may include a transparent display. The transparent display may be attached to the windshield or the window.

The display unit may be disposed in a portion of the steering wheel, a portion of the instrument panel, a portion of the seat, a portion of the pillar, a portion of the door, a portion of the center console, a portion of the head lining, or a portion of the sun visor, or may be implemented in a portion of the windshield or a portion of the window.

Meanwhile, the user interface device 200 may include a plurality of display units.

The audio output unit converts an electrical signal received from the processor 170 into an audio signal and outputs the audio signal. To this end, the audio output unit may include one or more speakers.

The haptic output unit generates a haptic output. For example, the haptic output unit may vibrate the steering wheel, the safety belt, or the seats, so that a user perceives the output.

Meanwhile, the user interface device 200 may be referred to as a vehicular display device.

The object detection device 210 may include at least one sensor capable of detecting objects outside the vehicle 10. The object detection device 210 may include at least one of a camera, a RADAR, a LiDAR, an ultrasonic sensor, or an infrared sensor. The object detection device 210 may provide data on an object, generated based on a sensing signal generated by the sensor, to at least one electronic device included in the vehicle.

The objects may be various items related to driving of the vehicle 10. For example, the objects may include a lane, another vehicle, a pedestrian, a 2-wheeled vehicle, a traffic signal, a light, a road, a structure, a speed bump, a geographic feature, an animal, and so on.

Meanwhile, the objects may be classified into mobile objects and fixed objects. For example, mobile objects may conceptually include another vehicle and a pedestrian, and fixed objects may conceptually include a traffic signal, a road, and a structure.

The camera may generate information on objects outside the vehicle 10 using an image. The camera may include at least one lens, at least one image sensor, and at least one processor, which is electrically connected to the image sensor, processes a received signal, and generates data on an object based on the processed signal.

The camera may be at least one of a mono camera, a stereo camera, or an Around View Monitoring (AVM) camera. The camera may acquire information on the location of an object, information on the distance to an object, or information on the relative speed with respect to an object using any of various image-processing algorithms. For example, the camera may acquire information on the distance to the object and information on the relative speed with respect to the object in the acquired image based on variation in the size of the object over time.

For example, the camera may acquire information on the distance to the object and information on the relative speed with respect to the object through a pin hole model, road surface profiling, or the like.

For example, the camera may acquire information on the distance to the object and information on the relative speed with respect to the object based on disparity information in a stereo image acquired by the stereo camera.

The RADAR may generate information on objects outside the vehicle 10 using an electronic wave. The RADAR may include an electromagnetic wave transmitter, an electromagnetic wave receiver, and at least one processor, which is electrically connected to the electromagnetic wave transmitter and the electromagnetic wave receiver, processes a received signal, and generates data on an object based on the processed signal.

The RADAR may be embodied as pulse radar or continuous wave radar depending on the principle by which an electronic wave is emitted. The RADAR may be embodied as Frequency Modulated Continuous Wave (FMCW)-type RADAR or Frequency Shift Keying (FSK)-type RADAR as a continuous wave RADAR scheme according to a signal waveform. The RADAR may detect an object using an electromagnetic wave based on a Time-of-Flight (ToF) scheme or a phase-shift scheme, and may detect the location of the detected object, the distance to the detected object, and the relative speed with respect to the detected object.

The LiDAR may generate information on objects outside the vehicle 10 using a laser beam. The LiDAR may include an optical transmitter, an optical receiver, and at least one processor, which is electrically connected to the optical transmitter and the optical receiver, processes a received signal, and generates data on an object based on the processed signal.

The LiDAR may be implemented in a ToF scheme or a phase-shift scheme. The LiDAR may be implemented in a driven or non-driven manner. When the LiDAR is implemented in a driven manner, the LiDAR may be rotated by a motor and may detect objects around the vehicle 10. When the LiDAR is implemented in a non-driven manner, the LiDAR may detect objects located within a predetermined range from the vehicle through optical steering.

The vehicle 10 may include a plurality of non-driven-type LiDARs. The LiDAR may detect an object using laser light based on a ToF scheme or a phase-shift scheme, and may detect the location of the detected object, the distance to the detected object, and the relative speed with respect to the detected object.

The communication device 220 may exchange a signal with a device located outside the vehicle 10. The communication device 220 may exchange a signal with at least one of infrastructure (e.g. a server or a broadcasting station) or other vehicles. The communication device 220 may include at least one of a transmission antenna, a reception antenna, a radio frequency (RF) circuit capable of realizing various communication protocols, or an RF element in order to perform communication.

The communication device 220 may include a short-range communication unit, a location information unit, a V2X communication unit, an optical communication unit, a broadcasting transceiver unit, and an Intelligent Transport System (ITS) communication unit.

The V2X communication unit is a unit used for wireless communication with a server (Vehicle to Infrastructure (V2I)), another vehicle (Vehicle to Vehicle (V2V)), or a pedestrian (Vehicle to Pedestrian (V2P)). The V2X communication unit may include an RF circuit capable of implementing a V2I communication protocol, a V2V communication protocol, and a V2P communication protocol.

Meanwhile, the communication device 220 may implement a vehicular display device together with the user interface device 200. In this case, the vehicular display device may be referred to as a telematics device or an audio video navigation (AVN) device.

The communication device 220 may communicate with a device outside the vehicle 10 using a 5G (e.g. a new radio (NR)) scheme. The communication device 220 may implement V2X (V2V, V2D, V2P, or V2N) communication using a 5G scheme.

The driving operation device 230 is a device that receives user input for driving the vehicle. In the manual mode, the vehicle 10 may be driven based on a signal provided by the driving operation device 230. The driving operation device 230 may include a steering input device (e.g. a steering wheel), an acceleration input device (e.g. an accelerator pedal), and a brake input device (e.g. a brake pedal).

The main ECU 240 may control the overall operation of at least one electronic device provided in the vehicle 10.

The driving control device 250 is a device that electrically controls various vehicle-driving devices provided in the vehicle 10. The driving control device 250 may include a powertrain driving controller, a chassis driving controller, a door/window driving controller, a safety device driving controller, a lamp driving controller, and an air-conditioner driving controller. The powertrain driving controller may include a power source driving controller and a transmission driving controller. The chassis driving controller may include a steering driving controller, a brake driving controller, and a suspension driving controller.

Meanwhile, the safety device driving controller may include a safety belt driving controller for controlling the safety belt.

The vehicle driving control device 250 may be referred to as a control electronic control unit (a control ECU).

The traveling system 260 may generate a signal for controlling the movement of the vehicle 10 or outputting information to the user based on the data on an object received from the object detection device 210. The traveling system 260 may provide the generated signal to at least one of the user interface device 200, the main ECU 240, or the vehicle-driving device 250.

The traveling system 260 may conceptually include an ADAS. The ADAS 260 may implement at least one of Adaptive Cruise Control (ACC), Autonomous Emergency Braking (AEB), Forward Collision Warning (FCW), Lane Keeping Assist (LKA), Lane Change Assist (LCA), Target Following Assist (TFA), Blind Spot Detection (BSD), High Beam Assist (HBA), Auto Parking System (APS), PD collision warning system, Traffic Sign Recognition (TSR), Traffic Sign Assist (TSA), Night Vision (NV), Driver Status Monitoring (DSM), or Traffic Jam Assist (TJA).

The traveling system 260 may include an autonomous-driving electronic control unit (an autonomous-driving ECU). The autonomous-driving ECU may set an autonomous-driving route based on data received from at least one of the other electronic devices provided in the vehicle 10. The autonomous-driving ECU may set an autonomous-driving route based on data received from at least one of the user interface device 200, the object detection device 210, the communication device 220, the sensing unit 270, or the location-data-generating device 280. The autonomous-driving ECU may generate a control signal so that the vehicle 10 travels along the autonomous-driving route. The control signal generated by the autonomous-driving ECU may be provided to at least one of the main ECU 240 or the vehicle-driving device 250.

The sensing unit 270 may sense the state of the vehicle. The sensing unit 270 may include at least one of an inertial navigation unit (IMU) sensor, a collision sensor, a wheel sensor, a speed sensor, an inclination sensor, a weight detection sensor, a heading sensor, a position module, a vehicle forward/reverse movement sensor, a battery sensor, a fuel sensor, a tire sensor, a steering sensor for detecting rotation of the steering wheel, a vehicle internal temperature sensor, a vehicle internal humidity sensor, an ultrasonic sensor, an illuminance sensor, an accelerator pedal position sensor, or a brake pedal position sensor. Meanwhile, the inertial navigation unit (IMU) sensor may include at least one of an acceleration sensor, a gyro sensor, or a magnetic sensor.

The sensing unit 270 may generate data on the state of the vehicle based on the signal generated by at least one sensor. The sensing unit 270 may acquire sensing signals of vehicle orientation information, vehicle motion information, vehicle yaw information, vehicle roll information, vehicle pitch information, vehicle collision information, vehicle heading information, vehicle angle information, vehicle speed information, vehicle acceleration information, vehicle inclination information, vehicle forward/reverse movement information, battery information, fuel information, tire information, vehicle lamp information, vehicle internal temperature information, vehicle internal humidity information, a steering wheel rotation angle, vehicle external illuminance, the pressure applied to the accelerator pedal, the pressure applied to the brake pedal, and so on.

The sensing unit 270 may further include an accelerator pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and so on.

The sensing unit 270 may generate vehicle state information based on the sensing data. The vehicle state information may be generated based on data detected by various sensors provided in the vehicle.

For example, the vehicle state information may include vehicle orientation information, vehicle speed information, vehicle inclination information, vehicle weight information, vehicle heading information, vehicle battery information, vehicle fuel information, vehicle tire air pressure information, vehicle steering information, vehicle internal temperature information, vehicle internal humidity information, pedal position information, vehicle engine temperature information, and so on.

Meanwhile, the sensing unit may include a tension sensor. The tension sensor may generate a sensing signal based on the tension state of the safety belt.

The location-data-generating device 280 may generate data on the location of the vehicle 10. The location-data-generating device 280 may include at least one of a global positioning system (GPS) or a differential global positioning system (DGPS). The location-data-generating device 280 may generate data on the location of the vehicle 10 based on the signal generated by at least one of the GPS or the DGPS. In some embodiments, the location-data-generating device 280 may correct the location data based on at least one of the inertial measurement unit (IMU) of the sensing unit 270 or the camera of the object detection device 210.

The location-data-generating device 280 may be referred to as a location positioning device. The location-data-generating device 280 may be referred to as a global navigation satellite system (GNSS).

The vehicle 10 may include an internal communication system 50. The electronic devices included in the vehicle 10 may exchange a signal via the internal communication system 50. The signal may include data. The internal communication system 50 may use at least one communication protocol (e.g. CAN, LIN, FlexRay, MOST, and Ethernet).

FIG. 3 is a control block diagram of the base unit included in the in-vehicle infotainment system according to the embodiment of the present disclosure.

Referring to FIG. 3, the base unit 1000 may include a memory 140, a processor 170, an interface unit 180, a power supply unit 190, a video link hub 175, and a first SoC 300.

The memory 140 is electrically connected to the processor 170. The memory 140 may store basic data about the units, control data necessary to control the operation of the units, and data that are input and output. The memory 140 may store data processed by the processor 170. In a hardware aspect, the memory 140 may be constituted by at least one of a ROM, a RAM, an EPROM, a flash drive, or a hard drive. The memory 140 may store various data necessary to perform the overall operation of the base unit 1000, such as a program for processing or control of the processor 170. The memory 140 may be integrated with the processor 170. In some embodiments, the memory 140 may be configured as a lower-level component of the processor 170.

The interface unit 180 may exchange a signal with at least one electronic device provided in the vehicle 10 in a wired or wireless manner. The interface unit 180 may exchange a signal with at least one of the object detection device 210, the communication device 220, the driving operation device 230, the main ECU 240, the vehicle-driving device 250, the ADAS 260, the sensing unit 270, or the location-data-generating device 280 in a wired or wireless manner. The interface unit 180 may be constituted by at least one of a communication module, a terminal, a pin, a cable, a port, a circuit, an element, or a device.

The interface unit 180 may receive data from an external server or an external device, or may transmit data within the base unit 1000 to an external server or an external device. In this case, the interface unit 180 may acquire data by communicating with an external server having a certified database.

The interface unit 180 may include a port for connection with a device provided with an identification module. The identification module may include a chip storing various types of information for verifying rights to use the base unit 1000.

The interface unit 180 may receive location data of the vehicle 10 from the location-data-generating device 280. The interface unit 180 may receive driving speed data from the sensing unit 270. The interface unit 180 may receive data on objects around the vehicle from the object detection device 210. The interface unit 180 may receive data generated by a device located outside the vehicle 10 from the communication device 220.

The power supply unit 190 may supply power to the base unit 1000. The power supply unit 190 may receive power from a power source (e.g. a battery) included in the vehicle 10, and may supply the power to the respective units of the electronic device. The power supply unit 190 may be operated in response to a control signal provided from the main ECU 240. The power supply unit 190 may be configured as a switched-mode power supply (SMPS).

The processor 170 may be electrically connected to the memory 140, the interface unit 180, the power supply unit 190, the video link hub 175, and the first SoC 300, and may exchange a signal therewith. The processor 170 may be configured using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or electrical units for performing other functions.

The processor 170 may be driven by the power supplied from the power supply unit 190. The processor 170 may receive data, process data, generate a signal, and provide a signal while receiving the power from the power supply unit 190.

The processor 170 may receive information from other electronic devices in the vehicle 10 through the interface unit 180. The processor 170 may provide a control signal to other electronic devices in the vehicle 10 through the interface unit 180.

In an embodiment of the present disclosure, the interface unit 180 may include a high-speed interface. The processor 170 may control other electronic devices in the vehicle 10 to transmit and receive image data for execution of an infotainment function through the high-speed interface.

The first SoC 300 may execute a first infotainment function. The second SoC 400 may execute a second infotainment function. The infotainment function may include at least one of a function of providing information on the state of the vehicle, a function of providing information on the travel of the vehicle, or an AVN function.

The information on the state of the vehicle may include data on the state of the vehicle generated by the at least one sensing unit 270. The information on the travel of the vehicle may include object information, traffic information, road information, or navigation information, which influences the travel of the vehicle and is generated by the object detection device 210, the communication device 220, or the location-data-generating device 280. The AVN function may include an audio function, a video function, or a navigation function.

The first infotainment function may include a function of providing first infotainment information to the user. The first infotainment information may include first image data. For example, the first infotainment function may be a function of outputting first image data through the user interface device 200.

The first infotainment function may include a function of providing at least one of information on the state of the vehicle, information on the travel of the vehicle, or audio video navigation (AVN) information, which is generated based on data acquired through at least one of the object detection device 210, the sensing unit 270, the communication device 220, or the location-data-generating device 280.

The second infotainment function may include a function of providing second infotainment information to the user. The second infotainment information may include second image data. For example, the second infotainment function may be a function of outputting second image data through the user interface device 200.

The second infotainment function may include a function of providing infotainment information acquired from the external server through communication with the external server by the second SoC. The external server may include at least one of a server providing a traffic information guide service, a communication server for a user's mobile terminal, or a server providing a connected service.

The processor 170 may control the video link hub 175 in order to execute the infotainment function of the SoC. The SoC may transmit an execution signal for execution of the infotainment function to the video link hub 175, and the processor 170 may control the video link hub 175 to transmit the received execution signal to the user interface device 200. The execution signal may include a signal for displaying infotainment information on the user interface device 200.

The infotainment function may include a function of outputting image data. In this case, the execution signal for execution of the infotainment function may include image data. That is, the processor 170 may control the video link hub 175 to output and transmit the image data generated by the SoC to the user interface device 200. Multiple SoCs may be provided.

The processor 170 may control the video link hub 175 to output image data generated by any one of a plurality of SoCs. The plurality of SoCs may include a first SoC of the base unit and a second SoC of the cartridge. One or more cartridges may be provided. In this case, a third SoC or a fourth SoC may be provided.

The processor 170 may receive detection signals from the plurality of SoCs, and may determine whether at least one of the plurality of SoCs is operating abnormally. The first SoC 300 may generate a first detection signal, and the second SoC 400 may generate a second detection signal. In the present disclosure, a detection signal that is not specified as a second detection signal is a first detection signal generated by the first SoC 300.

The processor 170 may receive the detection signal generated by the first SoC 300, and may determine whether the first SoC 300 is operating abnormally. The processor 170 may receive the second detection signal generated by the second SoC 400, and may determine whether the second SoC 400 is operating abnormally.

The processor 170 may monitor the detection signal. The processor 170 may determine whether the detection signal is a signal having a designated period and waveform. Upon determining that the detection signal generated by the first SoC 300 is continuously received with a designated period and waveform, the processor 170 may determine that the first SoC 300 is operating normally. In this case, the processor 170 may control the video link hub 175 to execute at least one of the first infotainment function or the second infotainment function through the user interface device 200.

The processor 170 may control the video link hub 175 to execute the first infotainment function and the second infotainment function together. In this case, the first SoC 300 may execute a composite infotainment function in which the first infotainment function and the second infotainment function are combined. The video link hub 175 may receive an execution signal for execution of the composite infotainment function from the first SoC, and may transmit the execution signal to the user interface device 200 in response to a control signal from the processor 170.

The first infotainment function may include a function of outputting first image data, which is basic image data. The basic image data may be image data generated based on data acquired through at least one of the object detection device 210, the communication device 220, the sensing unit 270, or the location-data-generating device 280 by the first SoC 300.

The basic image data may include image data related to Around View Monitoring (AVM), Surround View Monitoring (SVM), Audio Video Navigation (AVN), the state of the vehicle, and the travel of the vehicle. That is, the data related to the basic image may be data related to an image that is generated based on sensor data and is displayed to a user through a UI in a built-in infotainment system having no cartridge.

The second infotainment function may include a function of outputting, by the second SoC 400, second image data generated based on data acquired from an external server. The second image data may be image data for execution of navigation, an audio player, a DMB, and the like.

The second image data may include image data generated by the second SoC 400 based on data acquired from an external server. For example, the external server may be an OEM server that provides a connected service using 5G communication. In this case, the second image data may be image data related to a connected service including navigation. For example, the external server may be a communication server for the user's mobile terminal. In this case, the second image data may be image data related to an application executed in the user's mobile terminal.

The composite infotainment function may be an infotainment function obtained by combining the first infotainment function with the second infotainment function. The composite infotainment function may include a function of executing the first infotainment function and the second infotainment function together. That is, the composite infotainment function may include a function of outputting composite image data, obtained by combining the first image data with the second image data.

The processor 170 may control the video link hub 175 to transmit any one of a signal for execution of the first infotainment function, a signal for execution of the second infotainment function, and a signal for execution of the composite infotainment function to the user interface device 200. In this case, the processor 170 may receive a user input signal, and may perform control based on the input signal.

The processor 170 may receive the user input signal through the user interface device 200. For example, the processor 170 may receive at least one of voice input, gesture input, touch input, or mechanical input through the user interface device 200.

The processor 170 may receive a detection signal generated by the first SoC 300, and may determine whether the first SoC 300 is operating abnormally. The processor 170 may monitor the detection signal. The processor 170 may determine whether the detection signal is a signal having a designated period and waveform.

When it is determined as a result of monitoring that the detection signal does not have a designated period or waveform, the processor 170 may determine that the first SoC 300 is operating abnormally. Upon determining that the first SoC 300 is operating abnormally, the processor 170 may control the video link hub 175 so that the second SoC 400 executes an alternative infotainment function replacing the first infotainment function. In this case, the first SoC 300 may check whether an alternative infotainment function replacing the first infotainment function is present in the second infotainment function provided by the second SoC 400.

The alternative infotainment function may include at least one of a function of providing information on the state of the vehicle, a function of providing information on the travel of the vehicle, or an AVN function.

The alternative infotainment function may be a function of outputting alternative image data. The alternative image data may include data related to a basic image corresponding to the first image data generated by the second SoC 400. That is, the alternative image data may be image data capable of replacing the first image data when the first SoC 300 operates abnormally.

The alternative image data may be data related to a basic image generated by the second SoC 400 based on data acquired through the external server. The alternative image data and the first image data may correspond to each other in that the two image data are data related to the basic image. However, since the alternative image data is generated by the second SoC 400 and the first image data is generated by the first SoC 300, the two image data may not be identical to each other.

The video link hub 175 may receive a signal from the first SoC 300 or the second SoC 400. The video link hub 175 may receive, from the first SoC 300, at least one of an execution signal for execution of the first infotainment function or an execution signal for execution of the composite infotainment function. The video link hub 175 may receive, from the second SoC 400, at least one of an execution signal for execution of the second infotainment function or an execution signal for execution of the alternative infotainment function. The execution signal may include a signal for displaying infotainment information on the user interface device 200.

The video link hub 175 may transmit a signal to the user interface device 200. The video link hub 175 may transmit at least one of an execution signal for execution of the first infotainment function, an execution signal for execution of the composite infotainment function, an execution signal for execution of the second infotainment function, or an execution signal for execution of the alternative infotainment function to the user interface device 200.

The video link hub 175 may transmit and receive at least one of the first image data, the second image data, the alternative image data, or the composite image data through the high-speed interface. In some embodiments, the video link hub 175 may be configured as a lower-level component of the interface unit 180.

The first SoC 300 may provide the first infotainment function. The first infotainment function may include a function of providing at least one of information on the state of the vehicle, information on the travel of the vehicle, or audio video navigation (AVN) information, which is generated based on data acquired through at least one of the object detection device 210, the sensing unit 270, the communication device 220, or the location-data-generating device 280. In other words, the first infotainment function may include a function of providing the first infotainment information.

When the processor 170 determines that the first SoC 300 is operating abnormally, the first SoC 300 may search for an alternative infotainment function replacing the first infotainment function. The first SoC 300 may check whether an alternative infotainment function replacing the first infotainment function is present in the second infotainment function provided by the second SoC. In this case, when the second SoC is powered on, the first SoC 300 may first perform authentication with respect to the second SoC.

The second infotainment function may include a function of providing infotainment information acquired from the external server through communication with the external server by the second SoC. In other words, the second infotainment function may include a function of providing the second infotainment information.

The first SoC 300 may check whether the alternative infotainment function is present by checking whether corresponding infotainment information corresponding to the first infotainment information is present in the second infotainment information acquired from the external server by the second SoC. For example, the first SoC 300 may check whether the alternative infotainment function is present by checking whether corresponding image data corresponding to the first image data is present in the second image data.

The processor 170 may control the video link hub 175 to execute the first infotainment function and the second infotainment function together. In this case, the first SoC 300 may receive the second infotainment function from the second SoC 400, and may combine the first infotainment function with the second infotainment function. For example, the first SoC 300 may receive the second infotainment information from the second SoC 400, and may combine the first infotainment information with the second infotainment information.

The first SoC 300 may generate an execution signal for execution of the composite infotainment function, obtained by combining the first infotainment function with the second infotainment function. The video link hub 175 may receive the execution signal from the first SoC 300, and may transmit the execution signal to the user interface device 200 in response to a control signal from the processor 170.

The composite infotainment function may include a function of executing the first infotainment function and the second infotainment function together. For example, the composite infotainment function may include a function of outputting composite image data, obtained by combining the first image data with the second image data.

The composite image data may be image data obtained by receiving, by the first SoC 300, the second image data from the second SoC 400 and combining the second image data with the first image data. The first SoC 300 may generate data on the composite image, in which the first image data and the second image data are output together.

The base unit 1000 may include at least one printed circuit board (PCB). The memory 140, the processor 170, the interface unit 180, the power supply unit 190, the video link hub 175, and the first SoC 300 may be electrically connected to the printed circuit board.

FIG. 4 is a flowchart of the base unit according to the embodiment of the present disclosure.

Referring to FIG. 4, the base unit 1000 may perform the steps of checking the connection with the second SoC 400 (S100), performing authentication with respect to the second SoC 400 (S105), determining whether the first SoC 300 is operating abnormally (S110), checking whether an alternative infotainment function replacing the first infotainment function is present when the first SoC 300 operates abnormally (S115), receiving an execution signal for execution of the alternative infotainment function (S120), and controlling the video link hub 175 (S125).

The base unit 1000 may perform the steps of, when the first SoC 300 operates normally, checking the composite infotainment function (S130), receiving a user input signal (S135), and controlling the video link hub 175 to execute any one of the first infotainment function, the second infotainment function, and the composite infotainment function (S140).

The step of checking the connection with the second SoC 400 (S100) may include a step of checking the connection through communication with the processor 170 after the second SoC 400 is powered on. When powered on, the second SoC 400 may transmit a heartbeat signal to the processor 170, and upon receiving the heartbeat signal, the processor 170 may check the connection with the second SoC 400. When the connection with the second SoC 400 is completed, the processor 170 may notify the first SoC 300 of completion of the connection.

The step of performing authentication with respect to the second SoC 400 (S105) may be a step of performing, by the first SoC 300, authentication with respect to the second SoC 400 when the second SoC 400 is powered on. The first SoC 300 may request a stored certificate from the second SoC 400, and may verify ID information of the stored certificate. The first SoC 300 may check whether the ID information is identical to ID information of the paired second SoC. The authentication process may use a public-key encoding method.

The step of determining whether the first SoC 300 is operating abnormally (S110) may include the steps of receiving, by the processor 170, a detection signal from the first SoC 300, monitoring the detection signal, and determining that the first SoC is operating abnormally when the detection signal does not have a designated period or waveform.

The step of receiving the detection signal may be a step of receiving, by the processor 170, the detection signal generated by the first SoC 300. The processor 170 may receive the detection signal through the interface unit 180. The detection signal may be generated at a designated period and may have a designated shape. For example, referring to FIG. 7A, the detection signal may be a square-wave signal having a period of 2 seconds, a duty cycle of 50%, and an amplitude of 1 level (e.g. 5V). For example, the detection signal may be a heartbeat signal.

The step of monitoring the detection signal may be a step of monitoring, by the processor 170, whether the detection signal has a designated period and waveform.

The step of determining whether the first SoC is operating abnormally may include a step of determining, by the processor 170, that the detection signal is an abnormal signal when the detection signal does not have a designated period or waveform. For example, referring to FIG. 7B, it may be determined that a signal not having a designated period, e.g. 2 seconds, is generated. In this case, the processor 170 may determine that the detection signal is an abnormal signal. Upon detecting the abnormal signal, the processor 170 may determine that the first SoC is operating abnormally.

The step of checking whether an alternative infotainment function replacing the first infotainment function is present (S115) may include a step of checking the presence of an alternative infotainment function in the second infotainment function when it is determined in step S110 that the first SoC 300 is operating abnormally.

The step of checking the alternative infotainment function may be a step of checking the presence of an alternative infotainment function, which is capable of replacing the first infotainment function due to abnormal operation of the first SoC 300, in the second infotainment function. The first SoC 300 may check whether an alternative infotainment function replacing the first infotainment function is present in the second infotainment function provided by the second SoC 400.

The first infotainment function may be an infotainment function provided by the first SoC 300. The first SoC 300 may generate first infotainment information based on data acquired through at least one of the object detection device 210, the sensing unit 270, the communication device 220, or the location-data-generating device 280.

The first infotainment information may include a function of providing at least one of information on the state of the vehicle, information on the travel of the vehicle, or audio video navigation (AVN) information. The first infotainment information may include first image data. In this case, the first infotainment function may include a function of outputting the first image data.

The second infotainment function may be an infotainment function provided by the second SoC 400. The second SoC 400 may generate second infotainment information based on data acquired from the external server through communication with the external server.

For example, the external server may include a server that provides a traffic information guide service. In this case, the second infotainment information may be navigation information generated by the second SoC 400 based on information acquired through the external server.

For example, the external server may include a communication server for a user's mobile terminal. In this case, the second infotainment information may be information on an application executed in the user's mobile terminal, and the second infotainment function may be a function of outputting an execution screen of the application through the user interface device 200.

For example, the external server may include a server that provides a connected service. In this case, the second infotainment information may be information on a connected service received from the external server.

The second infotainment function may include a function of outputting second image data. The second SoC 400 may generate a signal for output of the second image data. The second image data may include image data generated by the second SoC 400 based on data acquired from the external server. For example, the external server may be an OEM server that provides a connected service using 5G communication. In this case, the second image data may be image data related to a connected service including navigation. For example, the external server may be a communication server for the user's mobile terminal. In this case, the second image data may be image data related to an application executed in the user's mobile terminal.

The alternative infotainment function may be an infotainment function included in the second infotainment function, which is capable of replacing the first infotainment function. The first SoC 300 may check whether the alternative infotainment function is present by checking whether corresponding infotainment information corresponding to the first infotainment information is present in the second infotainment information.

The alternative infotainment function may include a function of outputting alternative image data. The alternative image data may include data related to a basic image corresponding to the first image data generated by the second SoC 400. That is, the alternative image data may include image data that is capable of replacing the first image data when the first SoC 300 operates abnormally.

The step of receiving the execution signal for execution of the alternative infotainment function (S120) may include a step of receiving, by the video link hub 175, an execution signal for execution of the alternative infotainment function from the second SoC 400. The execution signal for execution of the alternative infotainment function may include a signal that is generated by the second SoC 400 and is used to display the corresponding infotainment information on the user interface device 200.

The step of controlling the video link hub 175 (S125) may be a step of controlling the video link hub 175 so that the processor 170 transmits the execution signal for execution of the alternative infotainment function to the user interface device. In this case, the processor 170 may receive a user input signal. The processor 170 may receive a user input signal regarding whether to execute the alternative infotainment function (S125), and may control the video link hub 175 to execute the alternative infotainment function based on the user input signal (S130).

The video link hub 175 may receive a control signal from the processor 170, and may transmit the execution signal for execution of the alternative infotainment function to the user interface device 200.

The step of checking the composite infotainment function (S130) may include a step of combining, by the first SoC 300, the infotainment functions in order to provide a composite infotainment function when it is determined in step S110 that the first SoC 300 is operating normally. In some embodiments, the step of checking the composite infotainment function may be performed after the user input signal is received.

The composite infotainment function may be an infotainment function obtained by combining the first infotainment function with the second infotainment function. The composite infotainment function may include a function of executing the first infotainment function and the second infotainment function together. That is, the composite infotainment function may include a function of providing the first infotainment information and the second infotainment information together.

The first SoC 300 may receive the second infotainment information from the second SoC 400, and may generate composite infotainment information by combining the second infotainment information with the first infotainment information. The composite infotainment function may include a function of providing the composite infotainment information. The first SoC may generate an execution signal for execution of the composite infotainment function.

The composite infotainment function may include a function of outputting composite image data, obtained by combining the first image data with the second image data. The composite image data may be image data obtained by receiving, by the first SoC 300, the second image data from the second SoC 400 and combining the second image data with the first image data. The first SoC 300 may generate data on the composite image, in which the first image data and the second image data are output together.

The processor 170 may receive the user input signal (S135), and may control the video link hub to execute any one of the first infotainment function, the second infotainment function, and the composite infotainment function (S140). The first SoC 300 may generate an execution signal for execution of the first infotainment function or the composite infotainment function in response to the user input signal. The second SoC 400 may generate an execution signal for execution of the second infotainment function in response to user input.

The video link hub 175 may receive a control signal from the processor 170, and may transmit any one of an execution signal for execution of the first infotainment function, an execution signal for execution of the second infotainment function, and an execution signal for execution of the composite infotainment function to the user interface device 200.

FIG. 5 is a flow diagram of a signal for each entity according to the embodiment of the present disclosure.

Referring to FIG. 5, the in-vehicle infotainment system 100 may check the flow of signals between the processor 170, the video link hub 175, the first SoC 300, and the second SoC 400, which is required for operation.

The infotainment system 100 including the multiple SoCs checks the connection between the first SoC 300 of the base unit 1000 and the processor 170 (S500), and checks the connection between the second SoC 400 of the cartridge 2000 and the processor 170 (S505). These steps may be steps of checking whether the multiple SoCs are connected to the processor 170 after the infotainment system 100 is booted.

When all of the connections are checked, the first SoC 300 and the second SoC 400 may perform a mutual authentication process (S510).

The mutual authentication process may be performed through exchange of a certificate between the first SoC 300 and the second SoC 400. The first SoC 300 may request a certificate from the second SoC 400, and the second SoC 400 may request a certificate from the first SoC 300. The second SoC 400 may transmit the certificate to the first SoC 300, and the first SoC 300 may transmit the certificate to the second SoC 400. For example, the certificate may be a root certificate.

The first SoC 300 and the second SoC 400 may receive the certificate and may verify the certificate. Verification of the certificate may include a process of checking whether information stored in the certificate is identical to cartridge information or information on the base unit. The information stored in the certificate may include ID information, and the authentication process may be performed by checking whether the ID information is the same. In this case, a public-key encoding method may be used.

When mutual authentication is completed, the first SoC 300 and the second SoC 400 may share the first infotainment function and the second infotainment function. Since the first SoC 300 and the second SoC 400 have completed authentication, the first SoC 300 and the second SoC 400 may safely share functions therebetween.

The first SoC 300 may transmit a detection signal, and the processor 170 may receive the detection signal (S520). The processor 170 may determine whether the first SoC 300 is operating abnormally based on the detection signal. When the period and the waveform of the detection signal are identical to a designated period and waveform, the processor 170 may determine that the first SoC is operating normally.

When the first SoC 300 operates normally, the processor 170 may set the video link hub 175 to connect the video link to the first SoC 300 or the second SoC 400 (S525). When the video link hub 175 is connected to the first SoC 300, the first SoC 300 may execute the first infotainment function or the composite infotainment function. When the video link hub 175 is connected to the second SoC 400, the second SoC 400 may execute the second infotainment function. Selection of any one of the first infotainment function, the second infotainment function, and the composite infotainment function may be determined based on a user input signal.

The processor 170 may check for abnormal operation of the first SoC based on the detection signal (S530). When the period or the waveform of the detection signal differs from a designated period or waveform, the processor 170 may determine that the first SoC is operating abnormally.

When the first SoC 300 operates abnormally, the processor 170 may request an alternative infotainment function (S531). The first SoC 300 may check the alternative infotainment function together with the second SoC 400. The alternative infotainment function may be an infotainment function included in the second infotainment function, which is capable of replacing the first infotainment function.

The first infotainment function may include a function of providing first infotainment information. The second infotainment function may include a function of providing second infotainment information. The first SoC 300 may check whether the alternative infotainment function is present by checking whether corresponding infotainment information corresponding to the first infotainment information is present in the second infotainment information.

When the alternative infotainment function is present, the second SoC 400 may generate an execution signal for displaying the corresponding infotainment information on the user interface device 200. The second SoC 400 may transmit the execution signal for displaying the corresponding infotainment information on the user interface device 200 to the video link hub.

The processor 170 may control the video link hub 175 to transmit the execution signal for displaying the corresponding infotainment information on the user interface device 200 to the user interface device 200.

The processor 170 may set the video link hub 175 to connect the video link to the second SoC 400 (S535). When the video link hub 175 is connected to the second SoC 300, the second SoC 300 may execute the second infotainment function or the alternative infotainment function. Selection of any one of the second infotainment function and the alternative infotainment function may be determined based on a user input signal.

When the first SoC 300 operates abnormally, redundancy of the function of the first SoC 300 may be achieved through the step of setting connection of the video link to the second SoC 400. A detailed description thereof will be given with reference to FIG. 6.

FIG. 6 is a diagram illustrating redundancy of the base unit 1000 and the cartridge 2000 according to the embodiment of the present disclosure.

Referring to FIG. 6, the base unit 1000 may include a first SoC 300, a processor 170, and a video link hub 175. In addition, the cartridge 2000 may include a second SoC 400.

The first infotainment function may include a function of outputting first image data, and the second infotainment function may include a function of outputting second image data. In the following description with reference to FIG. 6, output of the first image data through transmission and reception of the first image data may be understood as execution of the first infotainment function, and output of the second image data through transmission and reception of the second image data may be understood as execution of the second infotainment function.

The second SoC 400 may transmit the second image data to the first SoC 300 through the high-speed interface (S601). The second SoC 400 may transmit the second detection signal to the processor 170 through the interface unit 180 (S604). The second SoC 400 may transmit the second image data to the video link hub 175 through the high-speed interface (S606).

The first SoC 300 may transmit the first image data to the video link hub 175 through the high-speed interface (S602).

The first SoC 300 may transmit the first detection signal to the processor 170 through the interface unit 180 (S603).

The processor 170 may transmit a signal for controlling the video link hub 175 to output image data generated by the SoC that is operating normally through the detection signal (S605). The video link hub 175 may transmit a signal for outputting the image data to the display in response to the control signal from the processor 170 (S607).

For example, when the first SoC 300 operates abnormally and thus an error occurs in transmission of the first detection signal (S603), the processor 170 may transmit a signal for controlling the video link hub 175 to receive the signal S606 from the second SoC 400 but not to receive the signal S602 from the first SoC 300 (S605). In this case, the second SoC 400 may execute the function of the first SoC 300 instead of the first SoC 300, and redundancy of the function of the first SoC 300 may be achieved.

FIGS. 7A and 7B are diagrams illustrating the detection signal according to the embodiment of the present disclosure.

Referring to FIGS. 7A and 7B, the detection signal may be generated at a designated period and may have a designated shape. For example, referring to FIG. 7A, the detection signal may be a square-wave signal having a period of 2 seconds, a duty cycle of 50%, and an amplitude of 1 level (e.g. 5V). For example, the detection signal may be a heartbeat signal.

The detection signal may include a first detection signal generated by the first SoC and a second detection signal generated by the second SoC. The first detection signal and the second detection signal may be heartbeat signals having the same period and the same waveform. The processor 170 may receive the first detection signal and the second detection signal through the interface unit 180.

The processor 170 may monitor the detection signal, and may determine whether the detection signal has a designated period and waveform. When the detection signal does not have a designated period or waveform, the processor 170 may determine that the detection signal is an abnormal signal.

For example, referring to FIG. 7B, the processor 170 may determine that the detection signal does not have a designated period, e.g. 2 seconds, and thus may determine that the detection signal is an abnormal signal. The processor 170 may detect an SoC that is generating an abnormal signal, and may determine that the same is an SoC that is operating abnormally.

FIG. 8 is a diagram illustrating the composite infotainment function according to the embodiment of the present disclosure.

Referring to FIG. 8, the first SoC 300 may execute the composite infotainment function based on the first infotainment function and the second infotainment function. The composite infotainment function may include a function of executing the first infotainment function and the second infotainment function together.

The first infotainment function may include a function of outputting first image data, and the second infotainment function may include a function of outputting second image data. The composite infotainment function may include a function of outputting composite image data, obtained by combining the first image data with the second image data.

The first SoC 300 may combine the first image data with the second image data, and may generate data related to the composite image. The first image data may include image data related to Around View Monitoring (AVM), Surround View Monitoring (SVM), Audio Video Navigation (AVN), the state of the vehicle, and the travel of the vehicle. That is, the first image data may be data related to an image that is generated based on sensor data of the vehicle 10 and is displayed to the user through the UI in a built-in infotainment system having no cartridge.

The second image data may be image data that is generated by the second SoC 400, which is upgradable. For example, the second image data may be image data related to navigation, an audio player, a car player, a DMB, the Internet, and the like. The second image data 801 may vary depending on the function of the second SoC 400 of the cartridge. The second image data may include image data generated by the second SoC 400 based on data acquired from an external server.

For example, the external server may be an OEM server that provides a connected service using 5G communication. In this case, the second image data may be image data related to a connected service including navigation. The external server may provide a connected service to the vehicle 10 through the second SoC 400 of the cartridge.

For example, the external server may be a server of a user's mobile terminal. In this case, the second image data may be image data related to an application executed in the user's mobile terminal. The second SoC 400 of the cartridge may share an application executed in the user's mobile terminal with the base unit.

Referring to FIG. 8, the second image data 801 may be an execution screen of an application executed in the user's mobile terminal. The first SoC 300 may receive second image data 801 from the second SoC 400, and may combine the same with the first image data, as indicated by "802". As a result, the first SoC 300 may generate composite image data 803, which displays the first image data and the second image data together.

The composite image data 803 may be image data that is transmitted to the user interface device 200 such that the first image data and the second image data are displayed in respective areas allocated thereto. The positions at which the first image data and the second image data are displayed may be selected by the user. For example, the user may adjust the displayed positions of the first image data and the second image data by performing touch-and-drag gestures on the display.

FIGS. 9A to 9C are diagrams illustrating utilization of the second infotainment function according to the embodiment of the present disclosure.

Referring to FIGS. 9A to 9C, an embodiment of utilization of the second infotainment function in the composite infotainment function can be confirmed. The composite infotainment function may include a function of outputting composite image data, and the composite image data may be image data in which the first image data and the second image data are displayed in respective areas allocated thereto.

FIGS. 9A to 9C illustrate composite image data in which the first image data is displayed in the left area and the second image data is displayed in the right area. The first image data may be image data generated by a built-in base unit at the time of manufacture of the vehicle 10. For example, the first image data may be navigation image data 900 generated by the base unit. The second image data may vary depending on the function of the cartridge.

Referring to FIG. 9A, the second image data may be navigation image data 901 of the cartridge. The cartridge may execute navigation including a function different from the navigation of the base unit. The cartridge may execute navigation providing the latest traffic information through upgrade. In this case, the composite image data may include the navigation image data 900 of the base unit and the navigation image data 901 of the cartridge.

Referring to FIG. 9B, the second image data may be audio player image data 902 received by the cartridge from a communication server for the user's mobile terminal. The cartridge may communicate with the communication server for the user's mobile terminal through a communication device provided in the cartridge. In this case, the composite image data may include the navigation image data 900 of the base unit and the audio player image data 902 received by the cartridge from the user's mobile terminal.

Referring to FIG. 9C, the second image data may be connected service image data 903 received by the cartridge from an external OEM server. The cartridge may communicate with an external server through a communication device provided in the cartridge. The external server may be an OEM server that provides a connected service to the vehicle 10. In this case, the composite image data may include the navigation image data 900 of the base unit and the connected service image data 903 received by the cartridge from the external server.

FIG. 10 is a diagram illustrating the infotainment system according to the embodiment of the present disclosure.

Referring to FIG. 10, the infotainment system 100 may include a base unit 1000, a cartridge 2000, and a connector electrically connecting the base unit 1000 to the cartridge 2000.

The base unit 1000 may include a first SoC 300, a processor 170, and a video link hub 175. The base unit 1000 may further include a repeater, a switch, and a high-speed interface. The cartridge 2000 may include a second SoC 400 and a high-speed interface. The cartridge 2000 may further include an Ethernet PHY, and may further include a 5G or LTE communication device.

The base unit 1000 may be a built-in device configured to intensively process data generated by an electronic device in the vehicle. Therefore, upgrade of the base unit 1000 may be limited. The base unit 1000 may output information on the state of the vehicle, information on the travel of the vehicle, and entertainment information, which are generated by the vehicle 10, through the user interface device 200.

The cartridge 2000 is a device for performing a new function, other than the function of the electronic device in the vehicle. The cartridge 2000 may be a detachable device or a built-in device. Therefore, the cartridge 2000 may be freely upgraded. One or more cartridges 2000 may be provided, and may perform mutually different functions.

When the base unit 1000 and the cartridge 2000 execute respective applications, the base unit 1000 and the cartridge 2000 may share the executed applications therebetween. Accordingly, when the base unit 1000 operates abnormally, the display may be controlled through the cartridge, which is operating normally, thereby achieving redundancy of the base unit 1000.

Referring to FIG. 10, the first SoC 300 may receive the second infotainment function from the second SoC 400, may combine the same with the first infotainment function, and may transmit a signal for execution of the composite infotainment function to the video link hub 175 (S1001). When the first SoC 300 operates normally, the composite infotainment function may be executed in response to a user input signal.

The second infotainment function may be a new infotainment function added by the cartridge 2000. The second SoC 400 of the cartridge 2000 may receive data generated from an additional device 290 (S1001-1), and may generate a signal for execution of the second infotainment function in order to output the received data through the user interface device 200.

The additional device 290 may be a device that is additionally mounted in the vehicle 10 in order to execute a new function of the cartridge 2000. The additional device 290 may include an internal camera for photographing a driver, an internal camera for photographing a passenger, and the like.

When the first SoC 300 operates abnormally, the second SoC 400 may receive data from the electronic device in the vehicle (S1002-1), and may execute an alternative infotainment function replacing the first infotainment function. The second SoC 400 may transmit a signal for execution of the alternative infotainment function to the video link hub 175 (S1002).

When the first SoC 300 operates abnormally, the alternative infotainment function may correspond to the first infotainment function executed by the first SoC 300 based on data received from the electronic device in the vehicle. Accordingly, redundancy of the function of the first SoC may be achieved.

FIG. 11 is a diagram illustrating a mutual authentication process between the first SoC and the second SoC according to the embodiment of the present disclosure.

Referring to FIG. 11, the first SoC 300 may store a first certificate, and the second SoC 400 may store a second certificate. The first certificate or the second certificate may be any one of a root certificate, an intermediate certificate, a TLS certificate, and a certificate for authentication of devices. The certificate may be stored in a memory through a root certificate authority, a TLS certificate authority, or a device certificate authority when an SoC is produced. The certificate may be stored in a memory through a device certificate authority or an external certificate server when an SoC is replaced or upgraded.

When connection with the processor 170 is completed after the system is booted, the first SoC 300 and the second SoC 400 may perform an authentication process. The authentication process may be performed when the system is initially booted, or may be performed when any one of the first SoC and the second SoC is replaced or upgraded. The authentication process may be performed periodically.

The authentication process may be performed through exchange of certificates between the first SoC 300 and the second SoC 400. The first SoC 300 may request a second certificate from the second SoC 400 (S1101). The second SoC 400 may transmit the second certificate to the first SoC 300 (S1102). For example, the second certificate may be a root certificate.

The first SoC 300 may receive the second certificate, and may verify the second certificate (S1103). Verification of the second certificate may include a process of checking whether information stored in the second certificate is the same as cartridge information. For example, verification of the second certificate may include a process of checking whether an ID stored in the second certificate is the same as a product ID of the cartridge.

When verification of the second certificate is completed, the second SoC 400 may request a first certificate from the first SoC 300 (S1104). The first SoC 300 may transmit the first certificate to the second SoC 400 (S1105). For example, the first certificate may be a root certificate.

The second SoC 400 may receive the first certificate, and may verify the first certificate (S1106). Verification of the first certificate may include a process of checking whether information stored in the first certificate is the same as information on the base unit. For example, verification of the first certificate may include a process of checking whether an ID stored in the first certificate is the same as a product ID of the base unit.

The first SoC 300 may request the second certificate stored in the second SoC 400, and may check ID information of the second certificate. The second SoC 400 may request the first certificate stored in the first SoC 300, and may check ID information of the first certificate. In this case, a public-key encoding method may be used.

When exchange of the first certificate and the second certificate is completed and the identity of the information is verified, the authentication process may be completed. When the authentication process is completed, the first SoC 300 and the second SoC 400 may exchange and share data therebetween as mutually reliable processors.

At least one of the autonomous vehicle 10 of the present disclosure, a user terminal, or a server may be linked to or combined with an artificial intelligence module, a drone (unmanned aerial vehicle (UAV)), a robot, an augmented reality (AR) device, a virtual reality (VR) device, a device associated with a 5G service, etc.

For example, the autonomous vehicle 10 may operate in linkage with at least one artificial intelligence module included in the vehicle 10 and with a robot.

For example, the vehicle 10 may co-operate with at least one robot. The robot may be an autonomous mobile robot (AMR) that is autonomously movable. The mobile robot is configured to be autonomously movable, and as such is freely movable. The mobile robot may be provided with a plurality of sensors to enable the mobile robot to bypass an obstacle during travel, and as such may travel while bypassing obstacles. The mobile robot may be a flying-type robot (e.g. a drone) including a flying device. The mobile robot may be a wheeled robot including at least one wheel, and may move through rotation of the wheel. The mobile robot may be a leg-type robot including at least one leg, and may move using the leg.

The robot may function as an apparatus for increasing the convenience of the user of the vehicle. For example, the robot may perform a function of transporting a load carried in the vehicle 10 to a user's final destination. For example, the robot may perform a function of guiding a way to a final destination to a user who has exited the vehicle 10. For example, the robot may perform a function of transporting the user having exited the vehicle 10 to a final destination.

At least one electronic device included in the vehicle 10 may communicate with the robot through the communication device 220.

At least one electronic device included in the vehicle 10 may provide, to the robot, data processed in at least one electronic device included in the vehicle 10. For example, at least one electronic device included in the vehicle 10 may provide, to the robot, at least one of object data indicating an object around the vehicle 10, map data, data on the state of the vehicle 10, data on the location of the vehicle 10, or driving plan data.

At least one electronic device included in the vehicle 10 may receive, from the robot, data processed in the robot. At least one electronic device included in the vehicle 10 may receive at least one of sensing data generated in the robot, object data, robot state data, robot location data, or robot movement plan data.

At least one electronic device included in the vehicle 10 may generate a control signal based further on data received from the robot. For example, at least one electronic device included in the vehicle 10 may compare information about an object generated in the object detection device 210 with information about an object generated by the robot, and may generate a control signal based on the comparison result. At least one electronic device included in the vehicle 10 may generate a control signal in order to prevent interference between a travel path of the vehicle 10 and a travel path of the robot.

At least one electronic device included in the vehicle 10 may include a software module or a hardware module (hereinafter, an artificial intelligence (AI) module) realizing artificial intelligence. At least one electronic device included in the vehicle 10 may input acquired data to the artificial intelligence module, and may use data output from the artificial intelligence module.

The artificial intelligence module may execute machine learning of input data using at least one artificial neural network (ANN). The artificial intelligence module may output driving plan data through machine learning of input data.

At least one electronic device included in the vehicle 10 may generate a control signal based on data output from the artificial intelligence module.

In some embodiments, at least one electronic device included in the vehicle 10 may receive data processed through artificial intelligence from an external device via the communication device 220. At least one electronic device included in the vehicle 10 may generate a control signal based on data processed through artificial intelligence.

The above-described present disclosure may be implemented as computer-readable code stored on a computer-readable recording medium. The computer-readable recording medium may be any type of recording device in which data is stored in a computer-readable manner. Examples of the computer-readable recording medium include a Hard Disk Drive (HDD), a Solid-State Disk (SSD), a Silicon Disk Drive (SDD), ROM, RAM, a CD-ROM, a magnetic tape, a floppy disk, an optical data storage device, a carrier wave (e.g. transmission via the Internet), etc. In addition, the computer may include a processor or a controller. The above embodiments are therefore to be construed in all aspects as illustrative and not restrictive. The scope of the disclosure should be determined by reasonable interpretation of the appended claims, and all equivalent modifications made without departing from the disclosure should be considered to be included in the following claims.

What is claimed is:

1. A base unit comprising:
a video link hub electrically connected to a user interface device to transmit a signal;
a first system-on-chip (SoC) configured to provide a first infotainment function; and
a processor configured to determine whether the first SoC is operating abnormally,
wherein, when a second SoC is powered on, the first SoC performs authentication with respect to the second SoC,
wherein, when the processor determines that the first SoC is operating normally, the first SoC generates a first execution signal for display of a composite infotainment function, obtained by combining the first infotainment function with a second infotainment function provided by the second SoC, on the user interface device, and transmits the first execution signal to the video link hub, and
wherein the processor controls the video link hub to transmit the first execution signal to the user interface device.

2. The base unit according to claim 1, wherein the composite infotainment function comprises a function of executing an infotainment function obtained by combining the first infotainment function with the second infotainment function or executing the first infotainment function and the second infotainment function together.

3. The base unit according to claim 1, wherein the first infotainment function comprises a function of outputting first image data generated by the first SoC based on data acquired through at least one of an object detection device, a sensing unit, a communication device, or a location-data-generating device.

4. The base unit according to claim 3, wherein the second infotainment function comprises a function of outputting second image data generated by the second SoC based on data acquired from an external server through communication with the external server.

5. The base unit according to claim 4, wherein the external server comprises at least one of a server providing a traffic information guide service, a communication server for a user's mobile terminal, or a server providing a connected service.

6. The base unit according to claim 4, wherein the composite infotainment function comprises a function of outputting composite image data obtained by combining the first image data with the second image data.

7. The base unit according to claim 6, wherein the composite image data is image data configured such that the first image data and the second image data are displayed together in respective areas allocated thereto or image data configured such that the first image data and the second image data are displayed together in an overlapping manner.

8. The base unit according to claim 1, wherein, when a third SoC is powered on, the first SoC performs authentication with respect to the third SoC, and executes a composite infotainment function obtained by combining a third infotainment function provided by the third SoC with the first infotainment function and the second infotainment function, and
wherein the third infotainment function comprises a function of providing information on travel of a vehicle.

9. The base unit according to claim 8, wherein the first SoC, the second SoC, and the third SoC transmit and receive data through a high-speed interface.

10. The base unit according to claim 1, wherein the first SoC requests a certificate stored in the second SoC, and performs authentication with respect to the second SoC by verifying ID information of the stored certificate.

11. The base unit according to claim 1, wherein the processor receives a detection signal generated by the first SoC, monitors the detection signal, and determines that the first SoC is operating abnormally upon determining that the detection signal does not have a designated period or waveform, and
wherein, when the processor determines that the first SoC is operating abnormally, the first SoC checks whether an alternative infotainment function replacing the first infotainment function is present in a second infotainment function provided by the second SoC.

12. The base unit according to claim 11, wherein, when the first SoC checks that the alternative infotainment function is present in the second infotainment function, the processor controls the video link hub to execute the alternative infotainment function, and
wherein the video link hub receives a second execution signal for execution of the alternative infotainment function from the second SoC, and transmits the second execution signal to the user interface device in response to a control signal from the processor.

13. An operation method of a base unit, the method comprising:
   when a second SoC is powered on, performing, by a first SoC, authentication with respect to the second SoC;
   determining, by a processor, whether the first SoC is operating abnormally;
   when the first SoC operates normally, generating, by the first SoC, a first execution signal for display of a composite infotainment function obtained by combining a first infotainment function provided by the first SoC with a second infotainment function provided by the second SoC; and
   transmitting, by the first SoC, the first execution signal.

14. The method according to claim 13, wherein the first infotainment function comprises a function of outputting first image data generated by the first SoC,
   wherein the second infotainment function comprises a function of outputting second image data generated by the second SoC, and
   wherein the composite infotainment function comprises a function of outputting composite image data obtained by combining the first image data with the second image data.

15. The method according to claim 14, wherein the composite image data is image data configured such that the first image data and the second image data are displayed together in respective areas allocated thereto or image data configured such that the first image data and the second image data are displayed together in an overlapping manner.

16. The method according to claim 14, further comprising:
   when a third SoC is powered on, performing, by the first SoC, authentication with respect to the third SoC; and
   generating, by the first SoC, a second execution signal for execution of a composite infotainment function obtained by combining a third infotainment function provided by the third SoC with the first infotainment function and the second infotainment function, and
   wherein the third infotainment function comprises a function of providing information on travel of a vehicle.

17. The method according to claim 13, wherein the performing authentication with respect to the second SoC comprises:
   requesting, by the first SoC, a certificate stored in the second SoC; and
   performing authentication with respect to the second SoC by verifying ID information of the stored certificate.

18. The method according to claim 13, wherein the determining whether the first SoC is operating abnormally comprises:
   receiving, by the processor, a detection signal generated by the first SoC;
   monitoring, by the processor, the detection signal; and
   when the detection signal does not have a designated period or waveform, determining, by the processor, that the first SoC is operating abnormally, and
   wherein the method further comprises:
   when the first SoC operates abnormally, checking, by the first SoC, whether an alternative infotainment function replacing the first infotainment function is present in the second infotainment function.

19. The method according to claim 18, further comprising:
   when the alternative infotainment function is present,
   receiving, by a video link hub, a second execution signal for execution of the alternative infotainment function; and
   controlling, by the processor, the video link hub to transmit the second execution signal to a user interface device.

* * * * *